(12) United States Patent
Fukuda

(10) Patent No.: US 7,221,908 B2
(45) Date of Patent: May 22, 2007

(54) RADIO COMMUNICATION APPARATUS

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 10/537,490

(22) PCT Filed: Aug. 30, 2004

(86) PCT No.: PCT/JP2004/012501

§ 371 (c)(1),
(2), (4) Date: Jun. 3, 2005

(87) PCT Pub. No.: WO2005/036767

PCT Pub. Date: Apr. 21, 2005

(65) Prior Publication Data

US 2006/0046774 A1    Mar. 2, 2006

(30) Foreign Application Priority Data

Oct. 10, 2003  (JP) ............................. 2003-352223
Apr. 1, 2004   (JP) ............................. 2004-108648

(51) Int. Cl.
*H04B 13/02* (2006.01)
(52) U.S. Cl. .................. 455/40; 455/39; 455/41.1; 340/10.1; 332/103; 375/279; 375/280
(58) Field of Classification Search .............. 455/39, 455/40, 41.1, 41.2; 340/10.1; 332/103; 375/279, 280, 284, 308
See application file for complete search history.

(56) References Cited

U.S. PATENT DOCUMENTS

2001/0001758 A1* 5/2001 Greeff et al. .................. 455/41

FOREIGN PATENT DOCUMENTS

| JP | 10-145103 | * | 5/1998 |
| JP | 2001-24549 | | 1/2001 |
| JP | 2001-024549 | * | 1/2001 |

* cited by examiner

*Primary Examiner*—Lana Le
*Assistant Examiner*—Tuan H. Nguyen
(74) *Attorney, Agent, or Firm*—Oblon, Spivak, McClelland, Maier & Neustadt, P.C.

(57) ABSTRACT

A communication apparatus operating under a back scattering system involving processes of QPSK modulation is provided. The apparatus includes: a first signal channel for acquiring a first reflected wave by getting an incoming radio wave directly reflected without wave passage through any phase shifter; a second signal channel for acquiring a second reflected wave having a phase shifted by $\pi/2$ relative to the phase of the first reflected wave through two-way wave passage through a first phase shifter alone; a third signal channel for acquiring a third reflected wave having a phase shifted by $\pi$ relative to the phase of the first reflected wave through two-way wave passage through the first and a second phase shifter; and a fourth signal channel for acquiring a fourth reflected wave having a phase shifted by $3\pi/2$ relative to the phase of the first reflected wave through two-way wave passage through the first through a third phase shifter.

14 Claims, 9 Drawing Sheets

RADIO COMMUNICATION APPARATUS

TECHNICAL FIELD

The present invention relates to a wireless communication apparatus operating under a radio communication system that uses microwaves over a specific frequency band. More particularly, the invention relates to a wireless communication apparatus for communicating on a low level of power with an apparatus at a relatively close location.

Furthermore, the present invention relates to a wireless communication apparatus that permits data communication over relatively short distances by use of a back scattering system by taking advantage of the absorption and reflection of received radio waves based on the operation of antenna termination. In particular, the invention relates to a wireless communication apparatus for boosting the transmission rate of back scattering type data communication through a modulating process at higher bit rates than before.

BACKGROUND ART

RFID (radio frequency identification) is one typical means of locally usable wireless communication. RFID is implemented as a system primarily made up of tags and a reader, the reader reading information off each tag in non-contact fashion. Also called an ID system or a data carrier system, RFID is a recognition system that utilizes radio frequencies (radio waves). Communication between a tag and a reader/writer is effected by diverse methods including electromagnetic coupling, electromagnetic induction, and radio frequency communication (refer to Non-Patent Document 1)

An RFID tag is a device that contains specific identification information. In operation, the tag generates radio waves at a modulation frequency corresponding to the identification information upon receipt of radio waves on a particular frequency. The reader having read the RFID tag can determine its identity based on its oscillation frequency. It follows that an RFID-based system allows goods carrying RFID tags or owners of the goods to be identified using particular IDs written in the tags. At present, RFID is applied to numerous systems such as entry/exit management systems for managing people's comings and goings into and out of a controlled room, article identification systems deployed in the distribution industry, bill settlement systems at cafeterias, and theft prevention systems at retailers handling CDs and software products.

Illustratively, it is possible to build an IC chip having capabilities for data transmission and reception as well as data storage, a power source for driving the chip, and an antenna into a small-sized wireless identification apparatus in packaged form (refer to Patent Document 1). With this wireless identification apparatus in use, various items of data on goods and articles are transmitted via the antenna to receiving means of the IC chip. The transmitted data can be stored in a memory of the chip and can be output wirelessly to the outside via the antenna. This makes it possible for goods or articles carrying the chip to be tracked down and identified for their presence and location.

FIG. 9 shows a typical configuration of a conventional RFID system. Reference numeral 101 denotes an RFID tag constituted by a tag chip 102 and an antenna 103. The antenna 103 may illustratively be a half-wave dipole antenna. The tag chip 102 is made up of a modulation unit 110, a rectification/demodulation unit 112, and a memory unit 113.

A radio wave $f_0$ transmitted from a tag reader 100 is received by the antenna 103 before being input to the rectification/modulation unit 110. The unit 110 rectifies the received radio wave $f_0$ into a direct current that triggers a demodulation function. The radio wave is thus recognized as a readout signal from the tag 101. The power generated by reception of the radio wave $f_0$ is also fed to the memory unit 113 and modulation unit 110.

The memory unit 113 reads ID information previously stored internally and sends the retrieved information to the modulation unit 110 as outgoing data. The modulation unit 110, composed of a diode switch 111, turns on and off the switching action repeatedly in keeping with a bit image of the outgoing data. More specifically, when the data is "1," the diode switch 111 is turned on to terminate the antenna at antenna impedance (e.g., at 50 ohms). At this point, the radio wave from the tag reader 100 is absorbed. When the data is "0," the diode switch 111 is turned off (i.e., opened) to terminate the antenna in an open state. At this point, the radio wave from the tag reader 100 is reflected and sent back to where it came from. The reflection-absorption pattern of the incoming radio wave represents data in what is known as the back scattering system. In this manner, the tag 101 can transmit its internal information without dissipating power.

The tag reader 100 is constituted by a host device 106 such as a PDA, a tag reader module 104, and an antenna 105 connected to the tag reader module 104.

The host device 106 sends a read command from the tag 101 to a communication control unit 119 via a host interface unit 120. Upon receipt of the read command from the host interface unit 120, the communication control unit 119 edits outgoing data in a predetermined manner, filters the edited data, and sends the filtered data to an ASK modulation unit 117 as a base band signal. The ASK modulation unit 117 carries out ASK (amplitude shift keying) modulation by use of a frequency $f_0$ of a frequency synthesizer 116.

The frequency synthesizer 116 sets the frequency under control of the communication control unit 119. Generally, the transmission frequency to an RF tag is determined through hopping so as to reduce standing waves and multipath interference in the signal coming from the tag. A hopping command is also given by the communication control unit 119. An outgoing signal having undergone ASK modulation is forwarded to a circulator 114 before being emitted to the tag 101 from the antenna 105.

The tag 101 returns a signal at the same frequency as that of the signal coming from the tag reader 100 by the effect of reflection through back scattering (as described above). The returned signal is received by the antenna 105 of the tag reader 100 and input to a mixer 115. Because the mixer 115 admits the same local frequency $f_0$ as that of the outgoing signal, a signal modulated by the tag 101 appears at the output of the mixer 115. A demodulation unit 118 demodulates data formed by 1's and 0's out of the signal and forwards the data to the communication control unit 119. The communication control unit 119 decodes the data so as to acquire ID data that was held in the memory unit 113 inside the tag 101, and transfers the ID date through the host interface unit 120 to the host device 106.

In the above-described setup, the tag reader 100 can read information from inside the tag 101. The tag reader 100 generally doubles as a tag writer that can be used to write the data designated by the host device 106 into the memory unit 113 in the tag 101.

Conventionally, the above-described kind of back scattering type wireless communication system tags has been applied mainly to the identification and recognition of articles and persons typically through the use of RFID tags. That is because the range of communication by the communication system has been limited to relatively short distances.

Meanwhile, back scattering type wireless communication has the potential for providing wireless transmission channels at a very low level of power dissipation as long as the communication distance is limited. Recent years have witnessed the advent of IC chips carrying memory functions thanks to improved packaging techniques, with the memory capacity getting larger over time. Such developments have aroused the needs not only for the communication of identification and recognition information over relatively short distances but also for general data transmission applications based on back scattering type communication.

However, conventional back scattering type communications systems have failed to offer high data transmission rates necessary for general applications. That is because they operate on the principle of ASK (amplitude shift keying) or BPSK (binary phase shift keying), i.e., modulation methods of relatively low bit rates.

[Patent Document 1]
Japanese Patent Laid-open No. Hei 6-123773

[Non-Patent Document 1]
"RFID Handbook: the Principle and Applications of Non-contact IC Cards" (by Klaus Finkenzeller, translated into Japanese by Soft Kogaku Kenkyusho Ltd., and published by The Nikkan Kogyo Shimbun Ltd.).

DISCLOSURE OF INVENTION

[Problems to be Solved by the Invention]

It is therefore an object of the present invention to provide a wireless communication apparatus for carrying out data communication advantageously over relatively short distances under a back scattering system taking advantage of the absorption and reflection of received radio waves based on the operation of antenna termination.

It is another object of the present invention to provide a wireless communication apparatus for boosting the transmission rate of back scattering type data communication through a modulating process at higher bit rates than before.

[Means For Solving the Problems]

In carrying out the invention and according to a first aspect thereof, there is provided a wireless communication apparatus for performing data communication under a back scattering system using reflection of incoming radio waves, the wireless communication apparatus including a data transmission unit including: an antenna for receiving an incoming radio wave from a data transfer destination; as many as n signal channels wherein a k-th signal channel gives a phase difference of $(k-1)\lambda/2^{n-1}$ for one-way wave passage therethrough, where $1 \leq k \leq n$; and reflected wave forming means for forming reflected waves with as many as n different phases, by selecting any one of the signal channels in keeping with outgoing data; wherein the data transmission unit forms the outgoing data using a phase difference pattern of the reflected waves with regard to the incoming radio wave.

Preferably, the wireless communication apparatus of the above structure may further include a first through an (n−1)th phase shifter each giving a phase difference of $\lambda/2^{n+1}$ for one-way wave passage therethrough, the phase shifters being connected in series to the antenna. The n signal channels may preferably include a first signal channel for acquiring a first reflected wave by getting the incoming radio wave directly reflected without wave passage through any of the phase shifters, and a k-th signal channel for acquiring a k-th reflected wave having a phase shifted by $(k-1)\pi/2^{n-1}$ relative to the phase of the first reflected wave through two-way wave passage between the first phase shifter and a (k−1)th phase shifter, where $1 \leq k \leq n$.

The reflected wave forming means may preferably perform $2^n$ phase PSK modulation by dividing the outgoing data into increments of $2^{n-1}$ bits each and by assigning phases to the reflected waves through selection of a signal channel in keeping with combinations of 0's and 1's in the $2^{n-1}$ bits.

Preferably, the wireless communication apparatus of the above structure may further include a first through an n-th reflection point located between the antenna and the first phase shifter, between the (k−t)th phase shifter and the k-th phase shifter where $2 \leq k \leq n-1$, and downstream of the (n−1)th phase shifter. Each of the reflection points may illustratively be formed either by grounding or by use of an open termination.

The reflected wave forming means may preferably perform $2^n$ phase PSK modulation by dividing the outgoing data into increments of $2^{n-1}$ bits each and by assigning phases to the reflected waves through switching of the reflection points in keeping with combinations of 0's and 1's in the $2^{n-1}$ bits.

Where the invention is practiced as outlined above, wireless data transmission is carried out using a back scattering system that implements QPSK modulation where n=2.

In another preferred structure according to the invention, the wireless communication apparatus may further include a first through a third phase shifter each giving a phase difference of $\lambda/8$ for one-way wave passage therethrough, the phase shifters being connected in series to the antenna; wherein the n signal channels may include: a first signal channel for acquiring a first reflected wave by getting the incoming radio wave directly reflected without wave passage through any of the phase shifters; a second signal channel for acquiring a second reflected wave having a phase shifted by $\pi/2$ relative to the phase of the first reflected wave through two-way wave passage through the first phase shifter alone; a third signal channel for acquiring a third reflected wave having a phase shifted by $\pi$ relative to the phase of the first reflected wave through two-way wave passage through the first and the second phase shifters; and a fourth signal channel for acquiring a fourth reflected wave having a phase shifted by $3\pi/2$ relative to the phase of the first reflected wave through two-way wave passage through the first through the third phase shifters.

For example, if the data divided into two bits is "00," the first signal channel may be selected. If the data is "01," the second signal channel may be selected to acquire a reflected wave with its phase shifted by 90 degrees relative to the phase in effect when the data is "00." If the data is "10," the third signal channel may be selected to acquire a reflected wave with its phase shifted by 180 degrees relative to the phase in effect when the data is "00." If the data is "11," the fourth signal channel may be selected to acquire a reflected wave with its phase shifted by 270 degrees relative to the phase in effect when the data is "00." In this manner, it is possible to generate four reflected waves with four different phases 90 degrees apart from one another in accordance with the varying combination of two-bit data. This method provides reflected waves through QPSK modulation.

Preferably, the reflected wave forming means may perform PSK modulation using solely the first and the third signal channels.

In addition to data transmission applications, a method for generating polyphase modulated waves according to this invention is effective when used in general RFID applications in which no power source is provided. Illustratively, the wireless communication apparatus may further include a data reception unit constituted by a filter for allowing the incoming radio wave received by the antenna to pass on a predetermined frequency band, and by a data reception unit including a wave detection unit for forming a signal; wherein the data transmission unit and the data reception unit may be switched alternately depending on whether or not the outgoing data is transmitted. With this structure, the incoming radio wave from the antenna can be input to the wave detection unit with a minimum of losses through switching devices such as radio frequency switches and a band-pass filter.

According to a second aspect of the invention, there is provided a wireless communication apparatus for performing data communication under a back scattering system using reflection of incoming radio waves, the wireless communication apparatus including a data transmission unit including: an antenna for receiving an incoming radio wave from a data transfer destination; a first reflected signal channel made of a first radio frequency switch; a second reflected signal channel made of phase modulating means giving a phase difference of $\lambda/8$ and a second radio frequency switch; serial/parallel converting means for converting outgoing data from serial form into a parallel signal; and synthesizing/distributing means for distributing the incoming radio wave coming from the antenna to the reflected signal channels and for synthesizing outputs from the reflected signal channels; wherein activation and deactivation of each of the radio frequency switches are controlled using two data items constituting the data having undergone the serial/parallel conversion, so that the data transmission unit forms the outgoing data using a phase difference pattern of the reflected waves with regard to the incoming radio wave.

Where the wireless communication apparatus according to the second aspect of the invention is in use, two radio frequency switches are turned on and off so that one radio frequency switch incorporating a binary phase modulator generates a reflected signal with its phase shifted by $\lambda/8$ relative to the phase of another reflected signal generated by the other radio frequency switch. The apparatus thus generates outgoing data through four-phase PSK modulation under on-off control based on two data items converted from serial to parallel form.

With the above structure, the first reflected signal channel made of the first radio frequency switch functions as a BPSK modulator, and the second reflected signal channel made of the binary phase modulator and second radio frequency switch acts as another BPSK modulator. The latter BPSK modulator, with its binary phase modulating mean, provides a phase delay of $\lambda/8$ for one-way wave passage and a phase change of $\lambda/4$ for two-way wave passage. It follows that the latter BPSK modulator performs BPSK modulation on an axis that has a 90-degree phase difference with regard to the former BPSK modulator. This arrangement is equivalent to one which carries out QPSK modulation. That is because the first reflected signal channel performs BPSK modulation on the I axis while the second reflected signal channel executes BPSK modulation on the Q axis. In this case, the synthesizing/distributing means is used to divide the received radio wave into two branches and to synthesize the divided parts.

In the manner described, the incoming radio wave from the antenna is divided into two carriers by the synthesizing/distributing means before being subjected to QPSK modulation by the first and the second reflected signal channels. The reflected signals thus modulated are passed through the synthesizing/distributing means before being emitted again from the antenna.

The serial/parallel converting means converts the outgoing data from serial to parallel form, i.e., to a parallel signal of I and Q.

EFFECT OF THE INVENTION

According to the invention, as described, there is provided a wireless communication apparatus for communicating data advantageously over relatively short distances under the back scattering system utilizing absorption and reflection of received radio waves through operation of antenna termination.

The invention provides a wireless communication apparatus for communicating data under the back scattering system at higher transmission rates than before by means of a modulation method at improved bit rates such as QPSK modulation.

The invention also provides a wireless communication system and a wireless communication apparatus for wirelessly transferring picture data from portable devices such as digital cameras or cellular phones to PCs, televisions, printers or the like with a minimum of power dissipation.

The invention further provides a wireless communication system and a wireless communication apparatus for mostly transmitting data from one device to another located a relatively short distance apart with a minimum of power dissipation.

The invention thus offers arrangements for implementing a mobile device capable of transmitting picture data while realizing order-of-magnitude savings in power dissipation as compared with wireless LAN setups. Such inventive arrangements make it possible to boost the battery life of mobile devices considerably.

Furthermore, the invention permits easy implementation of a wireless transmission module as a data transmitter for a mobile device at an appreciably lower cost than wireless LAN alternatives. Such wireless transmission modules in the mobile device are not regarded as wireless stations under the Radio Law of Japan. That means there is no need for addressing the chores of requesting and obtaining permits such as Conformity Certificates from the competent authorities.

Other objects, features and advantages of the invention will become more apparent upon a reading of the following description and appended drawings.

BEST MODE FOR CARRYING OUT THE INVENTION

Preferred embodiments of this invention will now be described in detail with reference to the accompanying drawings.

This invention provides primarily a wireless communication setup for mostly transmitting data from one device to another located a relatively short distance apart with a minimum of power dissipation. According to the invention, wireless data transmission is implemented by use of reflected waves derived from the back scattering system for RFID. Already, RFID systems have been employed extensively as means of wireless communication usable only in strictly localized applications.

The RFID system is a system which is made up of a tag and a reader and which causes the reader to read information from inside the tag in noncontact fashion. The RFID tag is a device that contains unique identification information. Upon receipt of a radio wave at a particularly frequency, the tag generates a radio wave at a modulation frequency corresponding to the identification information held inside. The reader identifies the frequency thus generated by the RFID tag. The tag and reader/writer communicate with each other using a method such as electromagnetic coupling, electromagnetic induction, or radio frequency communication. This invention pertains to the radio frequency communication method that utilizes microwaves illustratively on a 2.4 GHz band.

FIG. 1 is a schematic view showing a hardware structure of a wireless communication apparatus 300 embodying the invention. This wireless communication apparatus 300 may be a digital camera, a camera-equipped cellular phone, or like equipment that transmits picture data while operating primarily on batteries, not shown.

As a digital camera, the wireless communication apparatus 300 is constituted illustratively by a camera unit 302, a signal processing unit 303, a memory card interface unit 304, an operation/display unit 305, and a USB interface unit 306.

The signal processing unit 303 converts picture data coming from the camera unit 302 into JPEG (Joint Photographic Experts Group) or some other suitable format. The picture data thus converted is placed into an external memory card 307 for storage through the memory card interface 304.

The operation/display unit 305 provides picture displays and allows necessary settings to be made. The USB (universal serial bus) interface unit 306 is used to transfer picture data from the camera to a PC through a USB interface.

As its wireless transmission module 308, the wireless communication apparatus 300 of this embodiment uses a radio frequency type RFID tag.

The wireless transmission module 308 is made up of an antenna 309, radio frequency switches 310 and 311, a band-pass filter 312, and an ASK detection unit 313. This embodiment utilizes the 2.4 GHz band for its radio frequency.

In data transmissions including picture transfers, the radio frequency switch 311 is turned off along with the ASK detection unit 313 for transition into an open state in response to control signals from the signal processing unit 303. The wireless transmission module 308 receives picture data retrieved from the memory card 307 by the signal processing unit 303. Upon receipt of the retrieved picture data, the wireless transmission module 308 turns on or off the other radio frequency switch 310 connected to the antenna 309 in keeping with a bit image of the received data. For example, if the data is "1," the radio frequency switch 310 is turned on; if the data is "0," the switch 310 is turned off.

When the radio frequency switch 310 is on, the antenna 309 is short-circuited to ground to let a radio wave coming from a transfer destination (discussed later) be absorbed thereby, as illustrated. When the radio frequency switch 310 is off, the antenna 309 is left open so that the radio wave coming from the transfer destination is reflected. The operation of turning on and off the radio frequency switch 310 generates reflected waves with their phases 180 degrees apart in response to the incoming radio wave. That means the transfer destination can read a transmitted data signal such as picture data by detecting reflected phases of the incoming radio wave.

More specifically, with the back scattering system in effect, picture data is transmitted as reflected waves obtained by subjecting to PSK (phase shift keying) modulation the incoming radio wave generated through fluctuations in antenna load impedance as a result of turning on and off a radio frequency switch arrangement. The reflected wave signal from the wireless transmission module 308 is equivalent to a PSK-modulated wave.

The radio frequency switch 310 is generally composed of a GaAs IC that consumes scores of 10 µW or less of power. The communication method above thus provides wireless picture transmission at very low levels of power dissipation.

At the time of data reception, the radio frequency switch 311 is turned on along with the ASK detection unit 313 by control signals coming from the signal processing unit 303.

The band-pass filter 312 and ASK detection unit 313 are used to receive an ASK-modulated transmission acknowledge signal from the transfer destination. These two blocks are not needed if the transmission takes place on a one-way basis, i.e., without expecting acknowledgement. If acknowledgement is required, the control processes involved are carried out by the signal processing unit 303.

The band-pass filter 312 is used to let the incoming radio wave pass on the 2.4 GHz frequency band while attenuating signal components on any other frequency band. In acknowledging the transmission, the ASK detection unit 313 consumes 30 mW or less of power.

As a result, the average power dissipation during transmission of data such as pictures by the wireless communication apparatus of FIG. 1 amounts to 10 mW or less for the two-way communication setup involving acknowledgement and scores of 10 µW for the one-way data transmission without the need for acknowledgement. These levels of power dissipation are dramatically lower than those consumed on average by ordinary wireless LAN systems.

This invention also pertains to a wireless communication apparatus for transmitting data at a low level of power dissipation under the back scattering system utilizing reflection of incoming radio waves. The invention may be practiced otherwise by use of QPSK (quadrature phase shift keying) for the modulation of reflected waves by the wireless transmission module 308. The PSK method is replaced by the QPSK method for the purpose of boosting the speed of data transmission. Whereas PSK modulation requires assigning "0" and "1" to two phases 180 degrees apart, QPSK modulation involves assigning (0,0), (0, 1), (1, 0) and (1, 1) to phases 0, $\pi/2$, $\pi$ and $3\pi/2$ respectively for data transmission, the phases being $\pi/2$ apart from one another. The latter modulation method thus increases the bit rate appreciably. Generally, $2^n$ phase PSK modulation entails assigning data to $2^n$ phases that are $\pi/2^{n-1}$ apart from one another. That means, in simplified terms, the bit rate is made higher the greater the value of n.

FIG. 2 is a schematic view indicating a typical structure of the wireless communication apparatus. The wireless transmission module 308 includes an antenna 309, a radio frequency switch 311, a band-pass filter 312, and an ASK detection unit 313 all functioning in the same manner as their counterparts in the apparatus of FIG. 1. The wireless transmission module 308 also includes phase shifters 320, 321, and 322 connected in series to the antenna 309, as well as radio frequency switches 323, 324, 325 and 326 and a data decoder 327.

As described above, the back scattering system brings about data transmission by alternating absorption and reflection of incoming radio waves through on/off changeovers of radio frequency switches. Because the radio frequency switches 323, 324 and 325 can only be switched at limited speeds, it is necessary to forward information in a plurality of bits at each changeover for high-speed data transmission.

The phase shifters 320, 321 and 322 may each be formed by a line arrangement such as a strip line providing a λ (wavelength)/8 shift on the 2.4 GHz frequency band, or by an active phase shifter capable of varying its phase under voltage control. The phase shifters 320, 321 and 322 each generate a phase difference of 45 degrees for one-way wave passage and a phase difference of 90 degrees for two-way wave passage. Because the phase shifters 320, 321 and 322 are connected in series to the antenna 309, turning on and off the radio frequency switches 323, 324, 325 and 326 in different combinations provides different signal channels over which reflected waves of the incoming radio wave reciprocate. This arrangement gives four phase differences to the reflected waves.

For example, if the radio frequency switch 323 alone is turned on, the incoming radio wave is reflected at point "a" in FIG. 2. If the radio frequency switch 324 alone is turned on, the incoming radio wave is reflected at point "b" but the phase of the incoming wave is shifted by 90 degrees relative to that of the reflected wave at point "a" because of wave passage through the phase shifter 320. If the radio frequency switch 325 alone is turned on, the incoming radio wave is reflected at point "c" but the phase of the incoming wave is shifted by 180 degrees relative to that of the reflected wave at point "a" because of wave passage through the phase shifters 320 and 321. If the radio frequency switch 326 alone is turned on, the incoming radio wave is reflected at point "d" but the phase of the incoming wave is shifted by 270 degrees relative to that of the reflected wave at point "a" because of wave passage through the phase shifters 320, 321 and 322. That is, turning on any one of the radio frequency switches 323, 324, 325 and 326 alternatively can generate reflected waves with their four phases 90 degrees apart from one another.

For data transmissions such as picture transfers, the radio frequency switch 311 is turned off along with the ASK detection unit 313 for transition into an open state under control of the signal processing unit 303. The wireless transmission module 308 performs QPSK modulation by dividing data into increments of two bits, each increment being assigned a phase corresponding to the varying two-bit 0/1 combination.

More specifically, upon receipt of picture data read from the memory card 307 by the signal processing unit 303, the wireless transmission module 308 forwards bit images of the retrieved data to the data decoder 327. The data decoder 327 divides the received data into increments of two bits so as to turn on the radio frequency switch 323 alone if the data image is "00," to turn on the radio frequency switch 324 alone if the data image is "01," to turn on the radio frequency switch 325 if the data image is "11," and to turn on the radio frequency switch 326 alone if the data image is "10."

When the data is "00," the radio frequency switch 323 alone is turned on. This causes the incoming radio wave to be reflected at point "a."

When the data is "01," the radio frequency switch 324 alone is turned on. This causes the incoming radio wave to be reflected at point "b." Because of its passage through the phase shifter 320, the reflected wave has its phase shifted by 90 degrees relative to that of the reflected wave at point "a."

When the data is "11," the radio frequency switch 325 alone is turned on. This causes the incoming radio wave to be reflected at point "c." Because of its passage through the phase shifters 320 and 321, the reflected wave has its phase shifted by 180 degrees relative to that of the reflected phase at point "a."

When the data is "10," the radio frequency switch 326 alone is turned on. This causes the incoming radio wave to be reflected at point "d." Because of its passage through the phase shifters 320, 321 and 322, the incoming radio wave has its phase shifted by 270 degrees relative to that of the reflected wave at point "a."

In this manner, it is possible to generate QPSK-modulated reflected waves having four different phases 90 degree apart from one another in keeping with the varying two-bit value of data.

It is also possible for the wireless transmission module 308 of FIG. 2 to carry out PSK modulation. In this case, the radio frequency switches 324 and 326 are left uncontrolled. When the data is "0," the radio frequency switch 323 is turned on; when the data is "1," the radio frequency switch 325 is turned on so as to shift the phase of the reflected wave by 180 degrees relative to the phase in effect when the data is "0." That is, the same circuit can handle two modulation methods, QPSK and PSK. The two methods can be alternated dynamically during communication.

It will be appreciated that in addition to data communication applications, the inventive method of FIG. 2 for creating multiphase modulated waves is also effective for general RFID applications where no power supply is furnished.

Upon receipt of an incoming radio wave, the radio frequency switch 311 is turned on along with the ASK detection unit 313 under control of the signal processing unit 303. Furthermore, the radio frequency switches 323, 324 and 326 are turned off while the radio frequency switch 325 alone is turned on. With these settings in effect, the incoming, signal from the antenna 308 is input to the ASK detection unit 313 via the band-pass filter 312 with a minimum of losses.

The band-pass filter 312 and ASK detection unit 313 are used to receive an ASK-modulated transmission acknowledge signal from the transfer destination. These two blocks are not necessary if the transmission takes place on a one-way basis with no need for acknowledgement. If acknowledgement is required, the control processes involved are carried out by the signal processing unit 303.

In another variation of the wireless communication apparatus of FIG. 2 under the back scattering system adopting QPSK modulation, seven λ/16 phase shifters and eight radio frequency switches may be connected in the same manner as in the preceding example. This setup provides an eight-phase PSK modulation arrangement whereby eight reflected waves with their phases 45 degrees apart from one another are assigned to eight data bit patterns ranging from "000" to "111."

FIG. 3 is a schematic view depicting a typical structure of a wireless communication apparatus operating under a back scattering system adopting eight-phase PSK modulation. The apparatus of FIG. 3 includes a wireless transmission module 508 made up of an antenna 509, a radio frequency switch 511, a band-pass filter 512, and an ASK detection unit 512 all functioning in the same manner as their counterparts in the apparatus of FIG. 1. The wireless communication apparatus of FIG. 3 also includes seven phase shifters 521, 522, 523, . . . , 527 connected in series to the antenna 509; radio frequency switches 531, 532, 533, . . . , 538; and a data decoder 540.

As described above, the back scattering system implements data transmission by alternating absorption and reflection of incoming radio waves through on/off changeovers of radio frequency switches. Because the radio frequency switches 531, 532, 533, etc., can only be switched at limited speeds, it is necessary to forward information in a plurality of bits at each changeover for high-speed data transmission.

The phase shifters 521, 522, 523, . . . , 527 may each be formed by a line arrangement such as a strip line providing a λ/16 shift on the 2.4 GHz frequency band, or by an active phase shifter capable of varying its phase under voltage control. The phase shifters 521, 522, 523, . . . , 527 each generate a phase difference of 27.5 degrees for one-way wave passage and a phase difference of 45 degrees for two-way wave passage. Thus turning on and off the radio frequency switches 531, 532, 533, . . . , 538 in different combinations provides different signal channels over which reflected waves of the incoming radio wave reciprocate. This arrangement gives eight phase differences to the reflected waves.

For example, if the radio frequency switch 531 alone is turned on, the incoming radio wave is reflected at point "a" in FIG. 3. If the radio frequency switch 532 alone is turned on, the incoming radio wave is reflected at point "b" but the phase of the incoming wave is shifted by 45 degrees relative to that of the reflected wave at point "a" because of wave passage through the phase shifter 521. If the radio frequency switch 533 alone is turned on, the incoming radio wave is reflected at point "c" but the phase of the incoming wave is shifted by 90 degrees relative to that of the reflected wave at point "a" because of wave passage through the phase shifters 521 and 522. Likewise, if the radio frequency switch 538 alone is turned on, the incoming radio wave is reflected at point "h" but the phase of the incoming wave is shifted by 315 degrees relative to that of the reflected wave at point "a" because of wave passage through all seven phase shifters 521 through 527. That is, turning on any one of the radio frequency switches 531, 532, 533, . . . , 538 alternatively can generate reflected waves with their eight phases 45 degrees apart from one another.

For data transmissions such as picture transfers, the radio frequency switch 511 is turned off along with the ASK detection unit 513 for transition into an open state under control of the signal processing unit 503. The wireless transmission module 508 performs eight-phase PSK modulation by dividing data into increments of three bits, each increment being assigned a phase corresponding to the varying three-bit 0/1 combination.

More specifically, upon receipt of picture data read from the memory card 307 by the signal processing unit 503, the wireless transmission module 508 forwards bit images of the retrieved data to the data decoder 540. The data decoder 540 divides the received data into increments of three bits so as to turn on the radio frequency switch 521, alone if the data image is "000," to turn on the radio frequency switch 522 alone if the data image is "001," to turn on the radio frequency switch 523 if the data image is "011," and so on.

When the data is "000," the radio frequency switch 531 alone is turned on. This causes the incoming radio wave to be reflected at point "a." When the data is "001," the radio frequency switch 532 alone is turned on. This causes the incoming radio wave to be reflected at point "b." Because of its passage through the phase shifter 521, the reflected wave has its phase shifted by 45 degrees relative to that of the reflected wave at point "a" where the data is "000."

When the data is "011," the radio frequency switch 533 alone is turned on. This causes the incoming radio wave to be reflected at point "c." Because of its passage through the phase shifters 521 and 522, the reflected wave has its phase shifted by 90 degrees relative to that of the reflected phase at point "a" where the data is "000."

When the data is "010," the radio frequency switch 534 alone is turned on. This causes the incoming radio wave to be reflected at point "d." Because of its passage through the phase shifters 521, 522 and 523, the incoming radio wave has its phase shifted by 135 degrees relative to that of the reflected wave at point "a" where the data is "000." The switching operation entailing radio wave reflection proceeds in like manner.

As described, it is possible to generate eight-phase PSK-modulated reflected waves having eight different phases 45 degree apart from one another in keeping with the varying three-bit value of data.

It is also possible for the wireless transmission module 508 of FIG. 3 to carry out PSK modulation. In this case, all radio frequency switches except for the switches 531 and 534 are left uncontrolled. When the data is "0," the radio frequency switch 531 is turned on; when the data is "1," the radio frequency switch 534 is turned on so as to shift the phase of the reflected wave by 180 degrees relative to the phase in effect when the data is "0." That is, the same circuit can handle two modulation methods, eight-phase QPSK and PSK. The two methods can be alternated dynamically during communication.

It will be appreciated that in addition to data communication applications, the inventive method of FIG. 3 for creating multiphase modulated waves is also effective for general RFID applications where no power supply is furnished.

Upon receipt of an incoming radio wave, the radio frequency switch 511 is turned on along with the ASK detection unit 513 under control of the signal processing unit 503. Furthermore, only one of the radio frequency switches 531 through 538 is turned on and the other switches are left off. With these settings in effect, the incoming signal from the antenna 508 is input to the ASK detection unit 513 via the radio frequency switch 511 and band-pass filter 512 with a minimum of losses.

The band-pass filter 512 and ASK detection unit 513 are used to receive an ASK-modulated transmission acknowledge signal from the transfer destination. These two blocks are not necessary if the transmission takes place on a one-way basis with no need for acknowledgement. If acknowledgement is required, the control processes involved are carried out by the signal processing unit 503.

FIG. 4 is a schematic view indicating another structure of the wireless communication apparatus operating under the back scattering system adopting QPSK modulation. Whereas the apparatus of FIG. 2 has its reflection points formed by grounding, the apparatus of FIG. 4 are furnished, by contrast, with reflection points formed by an open termination each.

The wireless communication apparatus 308 in FIG. 4 is made up of an antenna 309; radio frequency switches 330, 332 and 334; phase shifters 331, 333 and 335 connected in series; and a data decoder 336. For purpose of simplification and illustration, the radio frequency switch 311, band-pass filter 312, and ASK detection unit 313 constituting the reception block in FIG. 2 are omitted from FIG. 4.

The phase shifters 331, 333 and 335 may each be formed by a line arrangement such as a strip line providing a λ/8 shift on the 2.4 GHz frequency band, or by an active phase shifter capable of varying its phase under voltage control. The phase shifters each generate a phase difference of 45 degrees for one-way wave passage and a phase difference of 90 degrees for two-way wave passage. Thus turning on and off the radio frequency switches 330, 332 and 334 in different combinations provides different signal channels over which reflected waves of the incoming radio wave reciprocate. This arrangement gives four phase differences to the reflected waves.

For example, if the radio frequency switch 330 is turned off, the incoming radio wave is reflected at point "a" in FIG. 4. If the radio frequency switch 330 is turned on and the radio frequency switch 332 is turned off, the incoming radio wave is reflected at point "b" but the phase of the incoming wave is shifted by 90 degrees relative to that of the reflected wave at point "a" because of wave passage through the phase shifter 331. If the radio frequency switches 330 and 332 are turned on and the radio frequency switch 334 is turned off, the incoming radio wave is reflected at point "c" but the phase of the incoming wave is shifted by 180 degrees relative to that of the reflected wave at point "a" because of wave passage through the phase shifters 331 and 333. If the radio frequency switches 330, 332 and 334 are all turned on, the incoming radio wave is reflected at point "d" but the phase of the incoming wave is shifted by 270 degrees relative to that of the reflected wave at point "a" because of wave passage through the phase shifters 331, 333 and 335. That is, turning on and off the radio frequency switches 330, 332 and 334 in different combinations can generate reflected waves with their four phases 90 degrees apart from one another.

In executing picture transfers, the wireless transmission module 308 performs QPSK modulation by dividing data into increments of two bits, each increment being assigned a phase corresponding to the varying two-bit 0/1 combination.

More specifically, upon receipt of picture data read from the memory card 307 by the signal processing unit 303, the wireless transmission module 308 forwards bit images of the retrieved data to the data decoder 336. The data decoder 336 divides the received data into increments of two bits so as to turn on the radio frequency switch 330 if the data image is "00," to turn on the radio frequency switch 330 and turn off the radio frequency switch 332 if the data image is "01," to turn on the radio frequency switches 330 and 332 and turn off the radio frequency switch 334 if the data image is "11," and to turn on all radio frequency switches 330, 332 and 334 when the data image is "10."

When the data is "00," the radio frequency switch 330 is turned off. This causes the incoming radio wave to be reflected at point "a."

When the data is "01," the radio frequency switch 330 is turned on and the radio frequency switch 332 is turned off. This causes the incoming radio wave to be reflected at point "b." Because of its passage through the phase shifter 331, the reflected wave has its phase shifted by 90 degrees relative to that of the reflected wave at point "a" where the data is "00."

When the data is "11," the radio frequency switches 330 and 332 are turned on and the radio frequency switch 334 is turned off. This causes the incoming radio wave to be reflected at point "c." Because of its passage through the phase shifters 331 and 333, the reflected wave has its phase shifted by 180 degrees relative to that of the reflected phase at point "a" where the data is "00."

When the data is "10," all radio frequency switches 330, 332 and 334 are turned on. This causes the incoming radio wave to be reflected at point "d." Because of its passage through the phase shifters 331, 333 and 335, the incoming radio wave has its phase shifted by 270 degrees relative to that of the reflected wave at point "a" where the data is "00."

As described, it is possible to generate QPSK-modulated reflected waves having four different phases 90 degree apart from one another in keeping with the varying two-bit value of data.

FIG. 5 is a schematic view presenting a hardware structure of a wireless communication apparatus for receiving data from the wireless communication apparatus of FIG. 2 or FIG. 4. The apparatus of FIG. 5 represents a picture reproducer such as a PC, a TV set, or a printer that displays or outputs received picture data.

The apparatus of FIG. 5 is fed with picture data by use of reflected waves. This requires a wireless reception module 400 to transmit an unmodulated carrier for producing reflected waves. The wireless reception module 400 is made up of an antenna 401 for the 2.4 GHz frequency band, a circulator 402, a reception unit 403, a transmission unit 406, a frequency synthesizer 409, a communication control unit 410, and a host interface unit 411. The reception unit 403 includes an orthogonal detection unit 404 and an AGC (auto gain control) amplifier 405. The transmission unit 406 includes a mixer 408 and a power amplifier 407. The host interface unit 411 is connected to a host device 412 such as a CP to which received picture data is transferred through the interface.

The wireless reception module 400 transmits the unmodulated carrier when the communication control unit 410 applies a predetermined DC voltage to the mixer 408. The frequency of the unmodulated carrier to be transmitted is determined by the frequency of the frequency synthesizer under control of the communication control unit 410. The apparatus of FIG. 5 utilizes the 2.4 GHz frequency band. The unmodulated carrier output by the mixer 408 is, amplified by the power amplifier 407 up to a predetermined level. The amplified carrier is emitted from the antenna 401 via the circulator 402.

The reflected wave coming from a picture transmission apparatus 300 has the same frequency as that which is transmitted by the aforementioned wireless reception module 400. The reflected wave is received by the antenna 401 and input to the reception unit 403 via the circulator 402. Because the orthogonal detection unit 404 is fed with a local frequency that is the same as the transmission frequency, a PSK- or QPSK-modulated wave derived from the modulation process by the picture transmission apparatus 300 appears at the output of the orthogonal detection unit 404. Because the incoming signal has a phase that differs from that of the local signal, the orthogonal detection unit 404 outputs its modulated signals as an I-axis signal and a Q-axis signal in keeping with the phase difference between the incoming and the local signals.

The AGC amplifier 405 controls its input I-axis and Q-axis signals optimally in gain before sending the gain-controlled signals to the communication control unit 410. Given the I-axis and Q-axis signals, the communication control unit 410 performs PSK or QPSK demodulation whereby the carrier and clock signal are reproduced. The correctly reproduced data is transferred to the host device 412 via the host interface unit 411.

If the data transmission from the picture transmission device 300 needs to be acknowledged, the communication control unit 410 transfers to the mixer 408 either ACK (acknowledgement) digital data if the received packet data is correct or NACK (negative acknowledgement) digital data if the received packet data is not correct. The transferred ACK or NACK digital data is subjected to ASK modulation. Whether or not the received data is correct is determined by verifying CRC (cyclic redundancy check) code attached to the picture data packets received.

FIG. 6 shows a typical control sequence in effect when the wireless communication apparatus 300 of FIG. 2 or FIG. 4 acting as a picture transmission device communicates data wirelessly with the wireless communication apparatus 400 of FIG. 5 working as a picture display device. The setup of FIG. 6 assumes that each transmission from one apparatus is acknowledged by the other apparatus. The control sequence is described below.

(Step 1)

In the picture transmission device, data transmission mode is established illustratively by the user.

(Step 2)

Likewise in the picture display device, data reception wait mode is established illustratively by the user.

(Step 3)

The picture display device as the destination for picture transfers transmits an unmodulated carrier by which the picture transmission device produces reflected waves.

(Step 4)

The picture transmission device having received the unmodulated carrier makes a data transmission request using reflected waves.

(Step 5)

The picture display device having received the data transmission request returns permission to send through ASK modulation.

(Step 6)

The picture display device transmits the unmodulated carrier for reflected wave formation.

(Step 7)

On receiving the unmodulated carrier, the picture transmission device transmits packetized data using reflected waves. In this step, the picture transmission device performs QPSK modulation by dividing data into increments of two bits, each increment being assigned a phase corresponding to the varying two-bit 0/1 combination (as discussed above).

(Step 8)

The picture display device subjects the received packetized data to QPSK demodulation thereby restoring the initial data. If the received data is found correct, the picture display device returns an ACK (acknowledgement) signal through ASK modulation; if the received data is not found correct, the picture display device returns a NACK (negative acknowledgement) signal. Whether or not the data is correct is determined by verifying CRC (cyclic redundancy check) code attached to the data packets received.

When transmitting the ACK or NACK signal, the picture display device may include in the same signal a command addressed to the picture transmission device. Illustratively, the picture display device may send a slide show request command to the picture transmission device.

In the manner described above, the picture display device can control the picture transmission device from a remote location. If the picture display device is a TV set that can be, operated by an infrared ray remote controller, it is possible to send a command from the remote controller to the picture display device which in turn forwards the command to the picture transmission device. That is, the picture transmission device can be controlled indirectly by use of the infrared ray remote controller.

Steps 6 through 8 are then repeated until all data has been transmitted.

In the control sequence described above, communications are conducted on a two-way basis so that the picture data is acknowledged when normally transmitted. Alternatively, communications may be performed on a one-way basis in the case of streaming data transfers from a video camera or like sources. Adopting the one-way transmission setup eliminates the need for the picture display device to return ASK-modulated acknowledgement signals. It is also unnecessary for the picture transmission device to receive the acknowledgement signals, which translates into further savings in power dissipation.

It will be appreciated that in executing the control sequence of FIG. 6, the picture transmission device has no need for an oscillator.

In the setup of FIG. 1, the picture transmission device such as a digital camera incorporates the wireless transmission module 308. However, this is not limitative of the invention. Alternatively, the wireless transmission module may be furnished as a detachable adapter connected externally to the inventive apparatus through USB (universal serial bus) or other suitable interfaces.

FIG. 7 schematically shows a typical structure of a wireless transmission module furnished as an adapter type module.

As illustrated, the picture transmission device in FIG. 7 includes a camera unit 602, a signal processing unit 603, a memory card interface unit 604, an operation/display unit 605, a USB interface unit 606, and a memory card 607. These components are substantially the same as their counterparts 202 through 207 of the conventional wireless LAN-capable digital camera shown in FIG. 6.

Generally, the USB interface unit 606 works as a slave. After reading picture data of interest from the memory card 607 through the memory card interface unit 604, the signal processing unit 603 transfers the retrieved data through the USB interface unit 606 to a PC (USB host) over a USB cable. In the setup of FIG. 4, the USB interface unit is switched to the host side when connected to a wireless transmission module 601 in a slave device that is attached externally through the USB interface. This setup is equivalent to the apparatus shown in FIG. 1.

The wireless transmission module 601 may be an adapter equipped with a USB connector and an antenna 609, illustratively taking the shape of a device indicated by reference numeral 620.

The wireless transmission module 601 shown in FIG. 4 is substantially the same as the wireless transmission module 308 depicted in FIG. 2 or FIG. 4, except that it is additionally provided with a USB interface unit 614.

Upon transmission of picture data, the radio frequency switch 311 is turned off along with the ASK detection unit 313 for transition into an open state under control of the signal processing unit 303. The wireless transmission module 308 receives the picture data retrieved from the memory card 607, by way of the host side USB interface unit 606 and slave-side USB interface unit 614. In this manner, it is possible to generate four reflected waves with four different phases 90 degrees apart from one another in accordance with the varying value of two-bit data. This system provides reflected waves through QPSK modulation, as discussed earlier. Illustratively, when the data is "01," the reflected wave has its phase shifted by 90 degrees; when the data is "11," the reflected wave has its phase shifted by 180 degrees; when the data is "10," the reflected wave has its phase shifted by 270 degrees.

Upon data reception, the band-pass filter and ASK detection unit are used to receive the ASK-modulated acknowledgement signal from the transfer destination (as discussed above). These two blocks are not necessary if the transmission takes place on a one-way basis with no need for acknowledgement. If acknowledgement is required, the control processes involved are executed by a communication control unit 608. A band-pass filter 612 is used to let the incoming radio wave pass on the 2.4 GHz frequency band while attenuating signal components on any other frequency band.

The setup of FIG. 7, as with the apparatus shown in FIG. 1, permits picture data transmission at very low levels of power dissipation. As the mobile device is getting progressively smaller to meet today's needs, the adapter type wireless transmission module like the above-described embodiment of the invention is considered particularly effective. Although this embodiment utilizes the USB interface for connection with the wireless communication apparatus such as a digital camera, this is not limitative of the invention. Any other suitable interface may be adopted instead.

FIG. 8 schematically depicts another typical structure of the wireless transmission module 308 for use with the wireless communication apparatus adopting QPSK modulation.

The wireless communication module 308 in FIG. 8 includes an antenna 901, synthesizing/distributing unit 902, radio frequency switches 903 and 905, a λ/8 phase shifter 904 connected serially to the radio frequency switch 905, and a serial/parallel converter 906. For purpose of simplification and illustration, the radio frequency switch 311, band-pass filter 312, and ASK detection unit 313 constituting the reception block in FIG. 2 are omitted from FIG. 8.

A signal channel branched by the synthesizing/distributing unit 902 and grounded via the radio frequency switch 903, and a signal channel grounded via the phase shifter 904 and radio frequency switch 905 each constitute a reflected signal channel for back scattering type communication. That is, the radio frequency switch 903 acts as a BPSK modulator; likewise the phase shifter 904 and radio frequency switch 905 operate as another BPSK modulator.

The latter BPSK modulator, having a λ/8 phase delay produced by the phase shifter 904, provides a phase difference of λ/4 for two-way wave passage. That means BPSK modulation is carried out on an axis 90 degrees apart from the axis of the former BPSK modulator. This arrangement is equivalent to implementing QPSK modulation, because the radio frequency switch 903 performs BPSK modulation on the I axis while the phase shifter 904 and radio frequency switch 905 carry out BPSK modulation on the Q axis. The synthesizing/distributing unit 902 is used here for signal bifurcation and synthesis.

In the embodiment described above, one of the two radio frequency switches 903 and 905 is short-circuited to ground in the actual circuitry. Alternatively, a short-circuit may be formed by use of a λ/4 open stub arrangement.

The two carriers formed by the synthesizing/distributing unit 902 bifurcating what has been received from the antenna 901 are subjected to QPSK modulation, one carrier being modulated by the radio frequency switch 903, the other carrier by the phase shifter 904 and radio frequency switch 905. The reflected signals thus modulated are again emitted from the antenna 901 via the synthesizing/distributing unit 902.

The serial/parallel converter 906 converts serially transmitted data into I and Q parallel signals.

More specifically, when the two bits of data following the serial/parallel conversion are "00," the radio frequency switches 903 and 905 are both turned off; when the two data bits are "01," the radio frequency switch 903 alone is turned on; when the data bits are "11," the radio frequency switch 905 alone is turned on; when the data bits are "10," the radio frequency switches 903 and 905 are both turned on.

Japanese Paten Laid-open No. Hei 10-209914 proposes a duplex wireless communication system including an interrogator and a plurality of tags positioned spatially apart from the interrogator. The interrogator of the proposed system transmits a carrier wave (CW) radio signal to at least one of the tags within the system whereby a subcarrier signal is QPSK-modulated in keeping with information signals. It should be noted that the proposed system performs ASK modulation in a secondary modulation stage (e.g., see FIG. 3 of the Application) using a subcarrier signal having undergone QPSK modulation in the primary modulation stage. In this case, the actual transmission rate is limited by the performance of the ASK modulation method in use. In other words, the QPSK modulation setup adopted by the proposed system does not contribute to any improvement in the transmission rate. The proposed system further entails problems associated with DC offset and mixer noises. According to the present invention, by contrast, the main carrier is QPSK-modulated on the principle that reflected signal channels provide phase differences by allowing the incoming radio wave to reciprocate thereon. Thus there exists a clear difference in structure between the proposed system of the above-cited Application and this invention.

INDUSTRIAL APPLICABILITY

It is to be understood that while the invention has been described in conjunction with specific embodiments with reference to the accompanying drawings, it is evident that many alternatives, modifications and variations will become apparent to those skilled in the art in light of the foregoing description without departing from the spirit or scope of the invention.

This invention pertains to a multiphase modulation method utilizing phase differences that occur between a plurality of reflected signal channels furnished in a manner constituting a back scattering type communication setup. The description above has primarily dealt with an RFID system having a reader reads information from inside tags in noncontact fashion. However, that embodiment is not limitative of the invention. In addition to data transmission applications, the inventive system is obviously effective when used in general RFID applications in which no power source is provided.

Thus the specificities contained in this description should not be construed as limiting the scope of the invention but as merely providing illustrations of some of the presently preferred embodiments of this invention. Accordingly, the scope of the invention should be determined by the appended claims and their legal equivalents, rather than by the examples given.

BRIEF DESCRIPTION OF DRAWINGS

FIG. 1 is a schematic view showing a hardware structure of a wireless communication apparatus 300 embodying the invention;

FIG. 2 is a schematic view indicating a typical structure of a wireless communication apparatus operating under a back scattering system adopting QPSK modulation;

FIG. 3 is a schematic view depicting a typical structure of a wireless communication apparatus operating under a back scattering system adopting eight-phase PSK modulation;

FIG. 4 is a schematic view indicating another structure of the wireless communication apparatus adopting QPSK modulation;

FIG. 5 is a schematic view presenting a hardware structure of a wireless communication apparatus for receiving data from the wireless communication apparatus of FIG. 2 or FIG. 4;

FIG. 6 is a control sequence diagram outlining a typical control sequence in effect when the wireless communication apparatus 300 of FIG. 2 or FIG. 4 acting as a picture transmission device communicates data wirelessly with the wireless communication apparatus 400 of FIG. 5 working as a picture display device;

FIG. 7 is a schematic view showing a typical structure of a wireless transmission module furnished as an adapter type module;

FIG. 8 is a schematic view depicting a typical structure of another wireless transmission module 308 for use with a wireless communication apparatus adopting QPSK modulation; and

FIG. 9 is a schematic view indicating a typical structure of a conventional RFID system.

DESCRIPTION OF REFERENCE CHARACTERS

Figure 1:
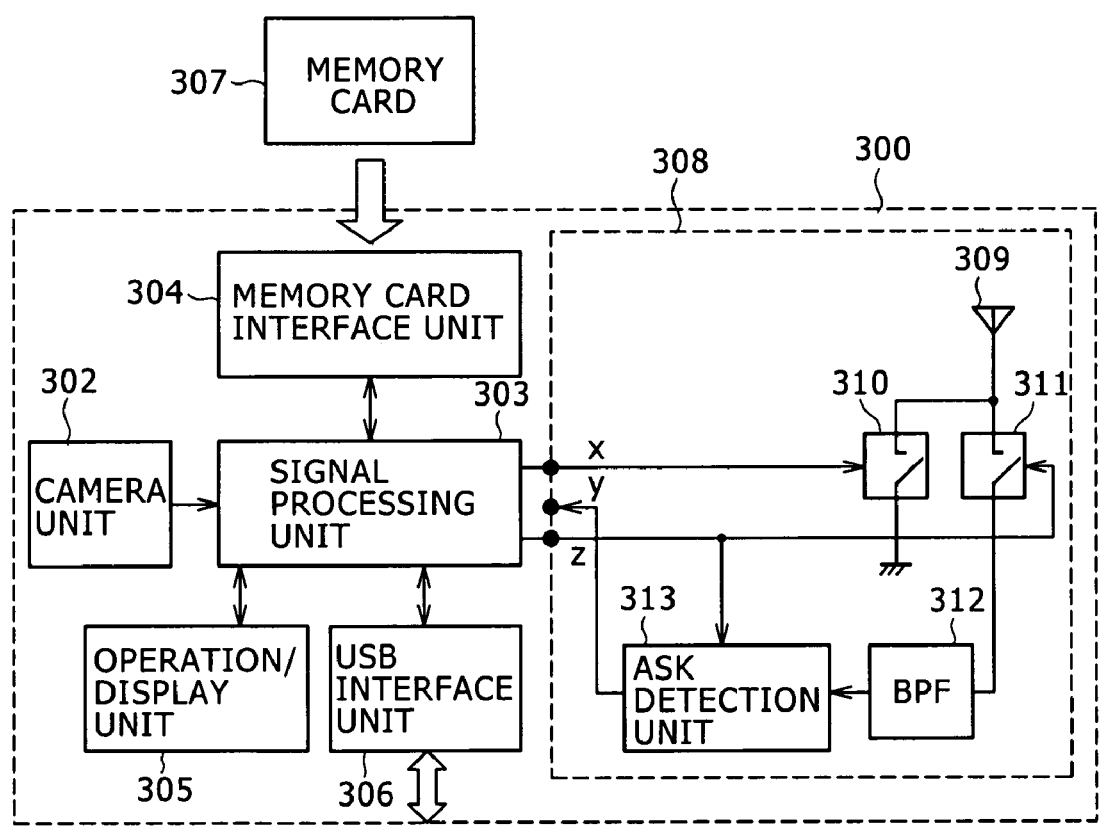
[FIG. 1]
Figure 2:
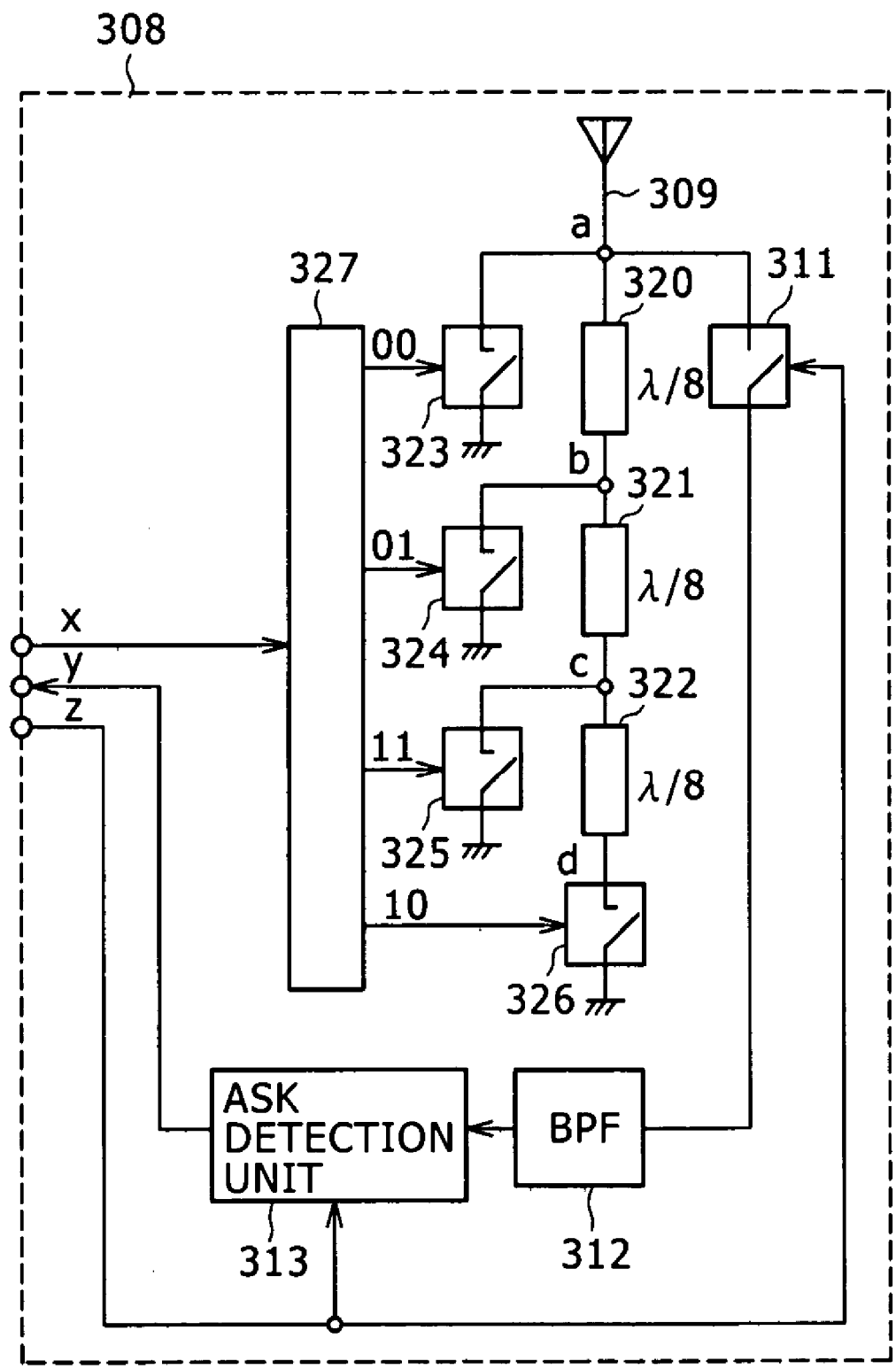
[FIG. 2]
Figure 3:
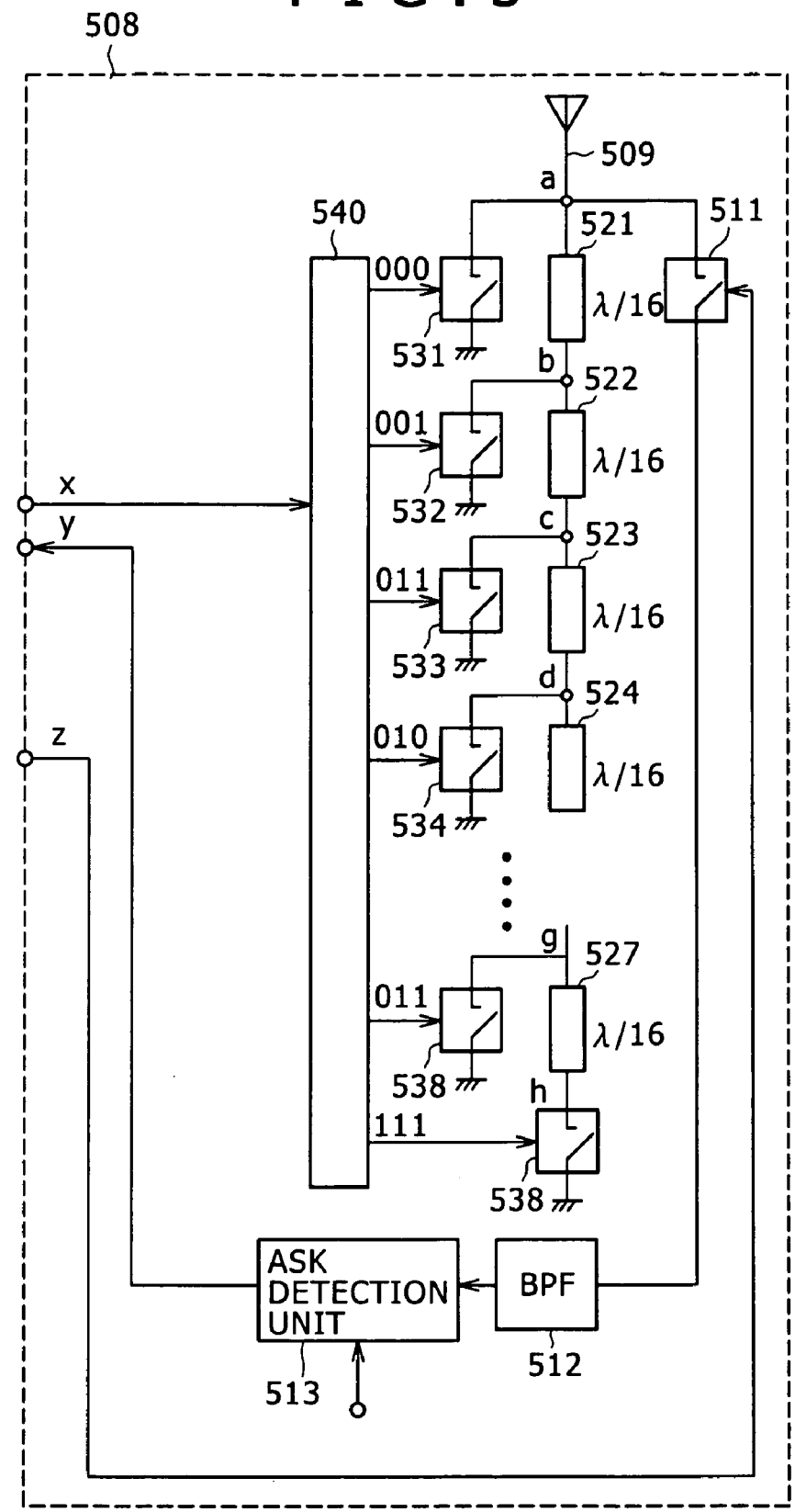
[FIG. 3]
Figure 4:
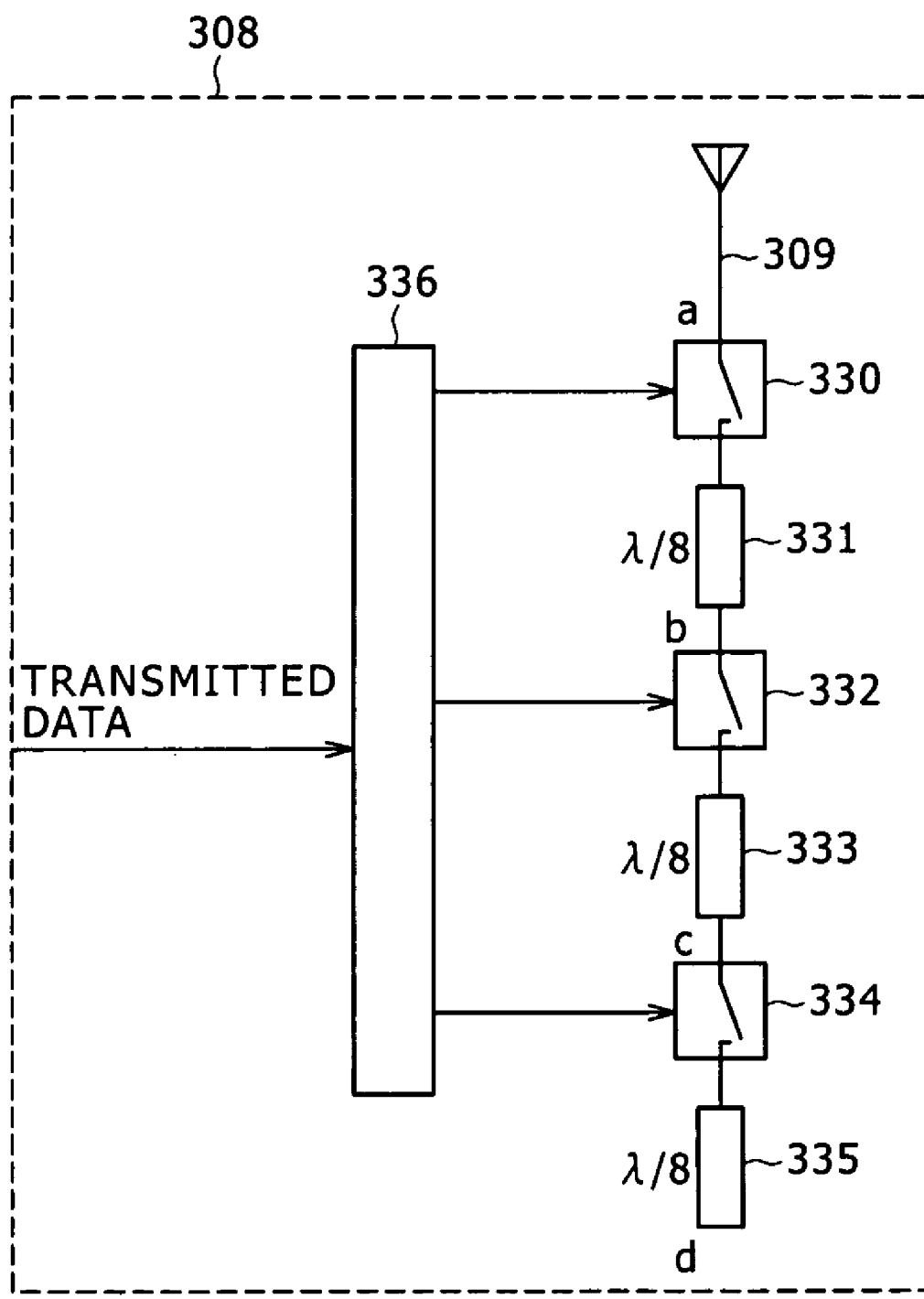
[FIG. 4]
Figure 5:
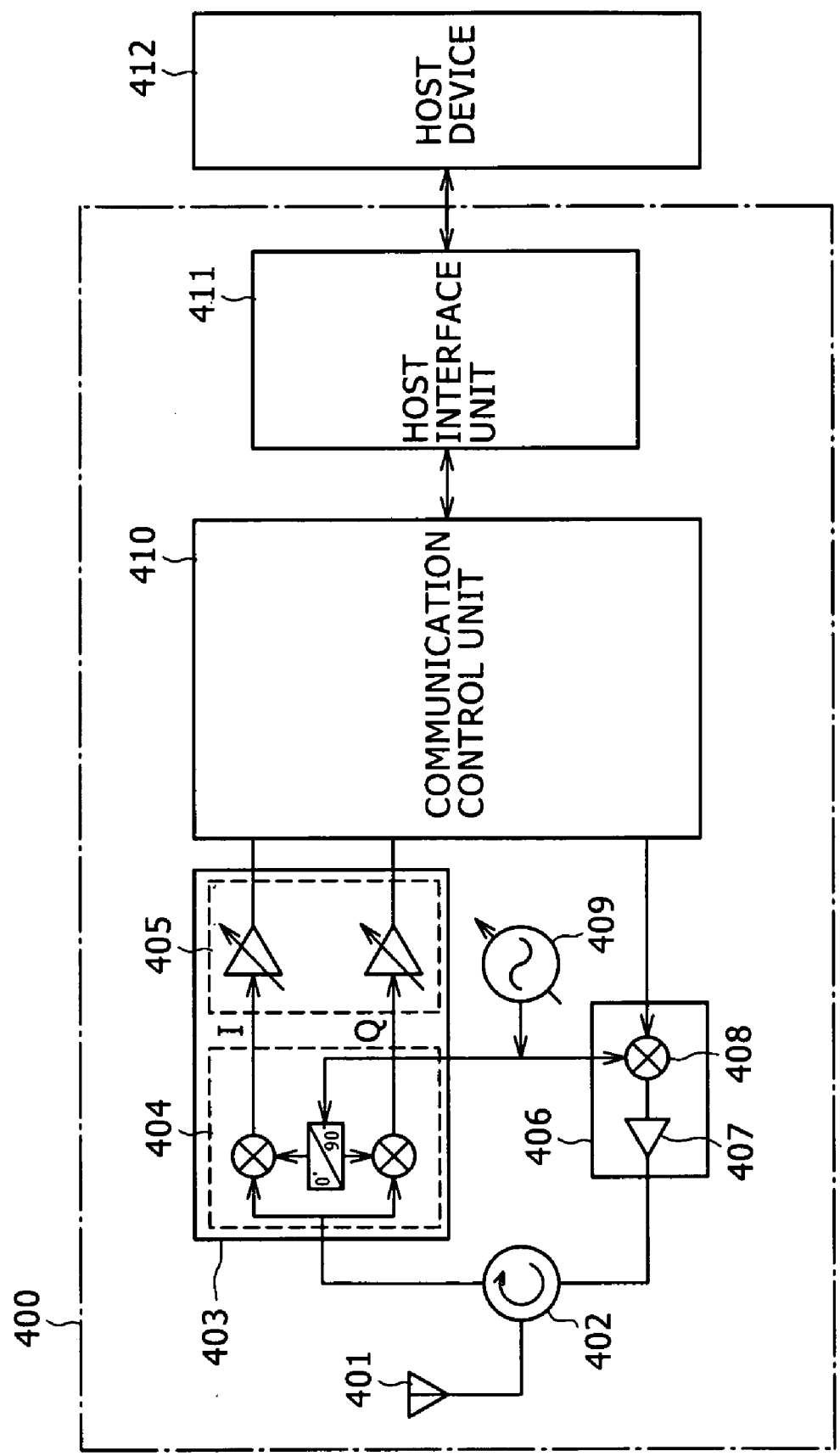
[FIG. 5]
Figure 6:
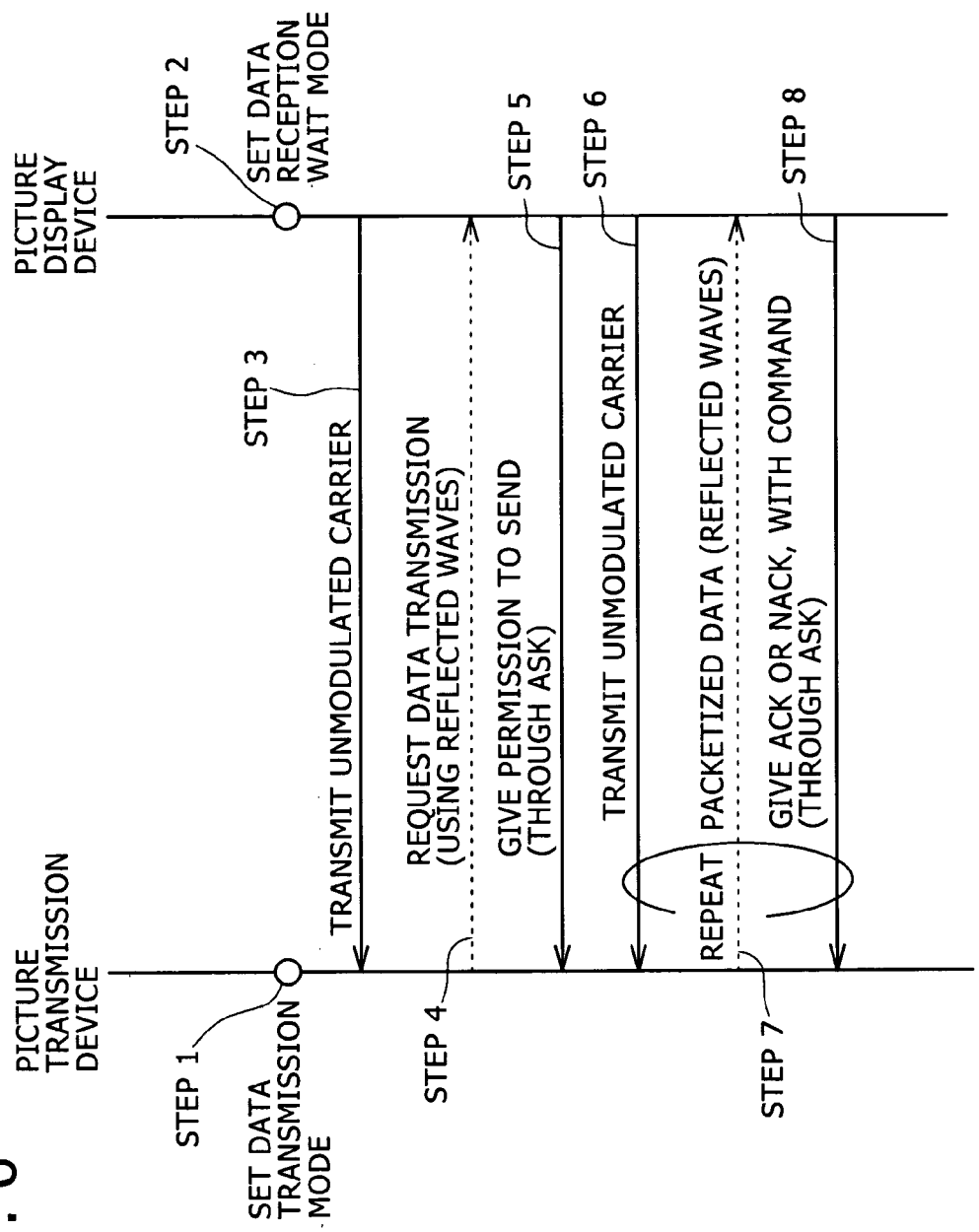
[FIG. 6]
Figure 7:
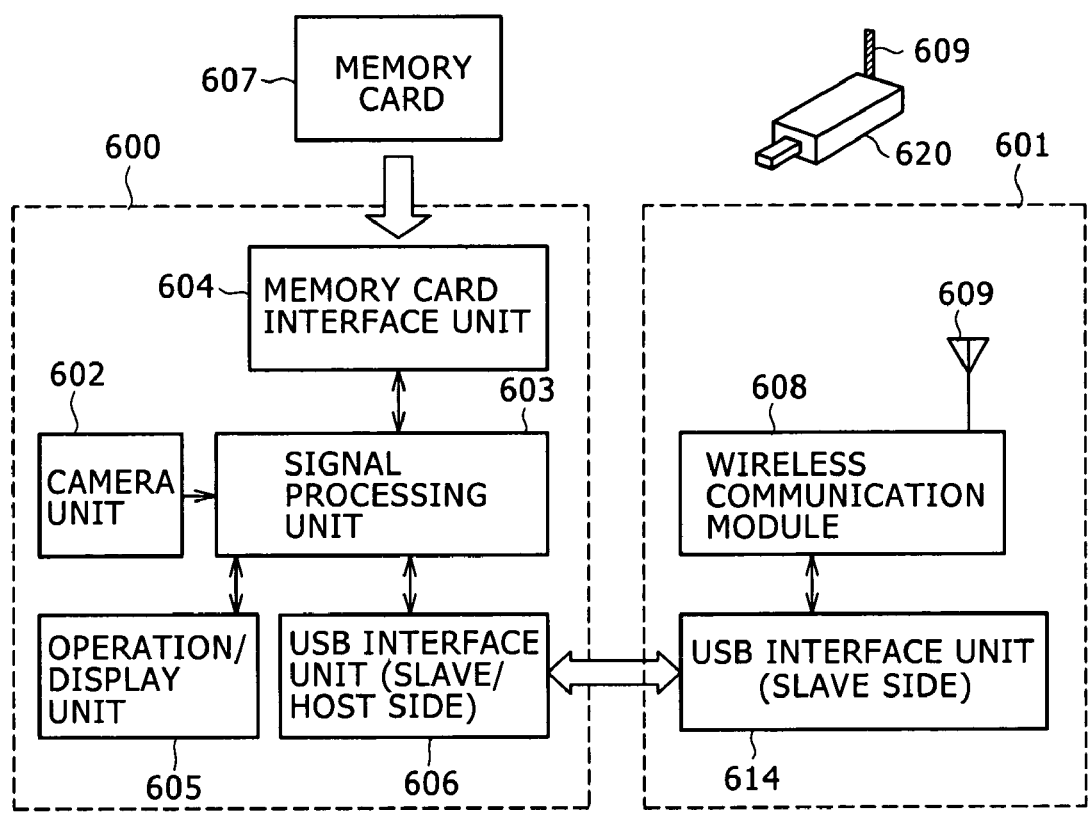
[FIG. 7]
Figure 8:
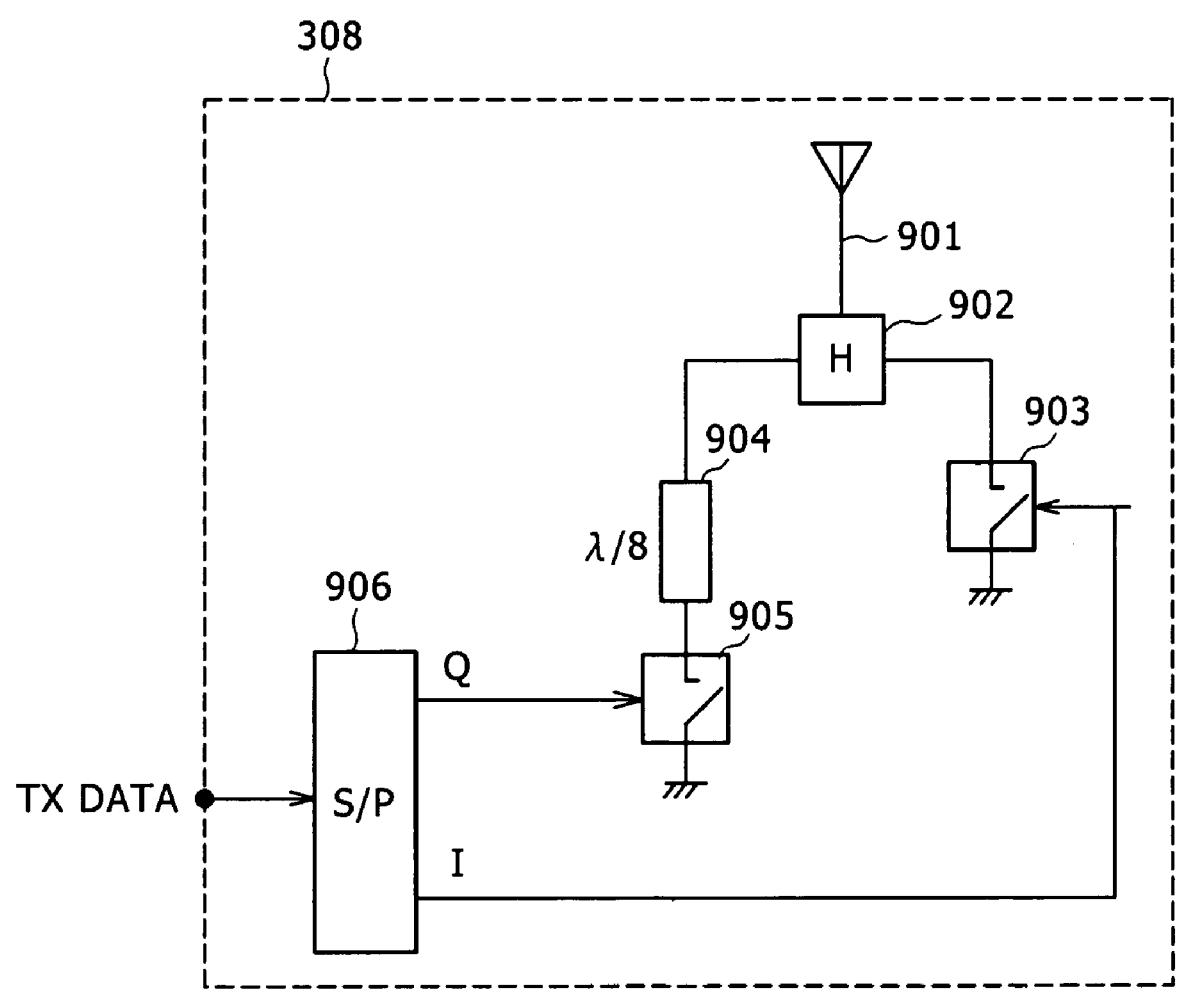
[FIG. 8]
Figure 9:
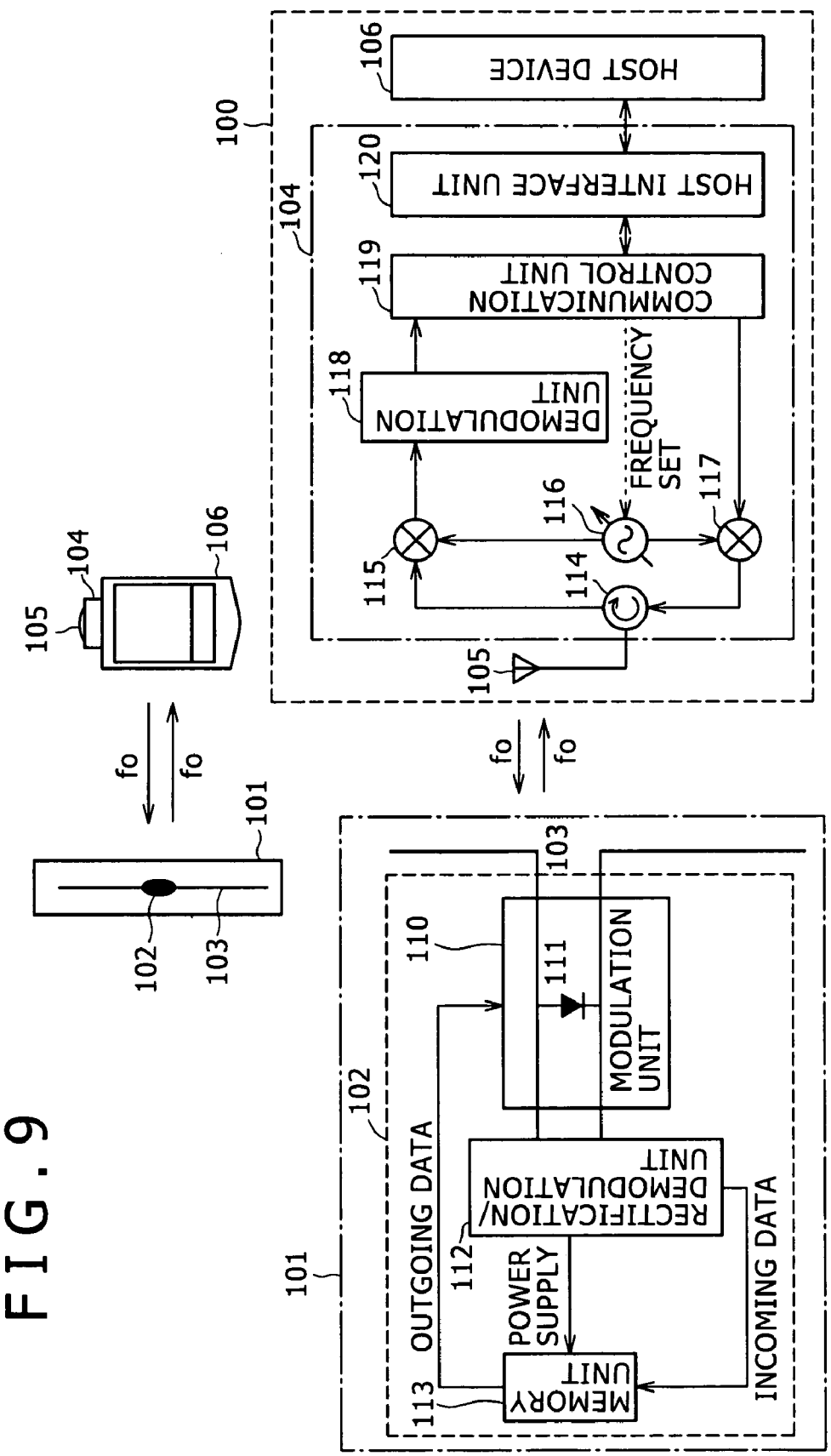
[FIG. 9]

300: wireless communication apparatus
302, 602 . . . Camera unit
303, 603 . . . Signal processing unit
304, 604 . . . Memory card interface unit
305 . . . Operation/display unit
306, 606 . . . USB interface unit 307, 607 . . . Memory card
308 . . . Wireless transmission module
309, 609 . . . Antenna
310, 311, 323, 324, 325 . . . Radio frequency switch
312 . . . Band-pass filter
313 . . . ASK detection unit
320, 321, 322 . . . Phase shifters
330, 332, 334 . . . Radio frequency switches
331, 333, 335 . . . Phase shifters
400 . . . Wireless reception module
401 . . . Antenna
402 . . . Circulator
403 . . . Reception unit
404 . . . Orthogonal detection unit
405 . . . AGC amplifier
406 . . . Transmission unit
407 . . . Power amplifier
408 . . . Mixer
409 . . . Frequency synthesizer
410 . . . Communication control unit
411 . . . Host interface unit
412 . . . Host device
901 . . . Antenna
902 . . . Synthesizing/distributing unit
903 . . . Radio frequency switch
904 . . . λ/8 phase shifter
905 . . . Radio frequency switch
906 . . . Serial/parallel converter

The invention claimed is:

1. A wireless communication apparatus for performing data communication under a back scattering system using reflection of incoming radio waves, said wireless communication apparatus comprising a data transmission unit comprising:

an antenna for receiving an incoming radio wave from a data transfer destination;

as many as n signal channels wherein a k-th signal channel gives a phase difference of $(k-1)\lambda/2^{n-1}$ for one-way wave passage therethrough, where $1 \leq k \leq n$; and reflected wave forming means for forming reflected waves with as many as n different phases, by selecting any one of said signal channels in keeping with outgoing data;

wherein said data transmission unit forms said outgoing data using a phase difference pattern of said reflected waves with regard to said incoming radio wave.

2. A wireless communication apparatus according to claim 1, further comprising a first through an (n−1)th phase shifter each giving a phase difference of $\lambda/2^{n+1}$ for one-way wave passage therethrough, the phase shifters being connected in series to said antenna;

wherein said n signal channels comprise a first signal channel for acquiring a first reflected wave by getting said incoming radio wave directly reflected without wave passage through any of said phase shifters, and a k-th signal channel for acquiring a k-th reflected wave having a phase shifted by $(k-1)\pi/2^{n-1}$ relative to the phase of said first reflected wave through two-way wave passage between said first phase shifter and a (k−1)th phase shifter, where $1 \leq k \leq n$; and wherein said reflected wave forming means performs $2^n$ phase PSK modulation by dividing said outgoing data into increments of $2^{n-1}$ bits each and by assigning phases to the reflected waves through selection of a signal channel in keeping with combinations of 0's and 1's in the $2^{n-1}$ bits.

3. A wireless communication apparatus according to claim 2, further comprising a first through an n-th reflection point located between said antenna and said first phase shifter, between said (k−t)th phase shifter and said k-th phase shifter where $2 \leq k \leq n-1$, and downstream of said (n−1)th phase shifter;

wherein said reflected wave forming means performs 2n phase PSK modulation by dividing said outgoing data into increments of $2^{n-1}$ bits each and by assigning phases to the reflected waves through switching of said reflection points in keeping with combinations of 0's and 1's in the $2^{n-1}$ bits.

4. A wireless communication apparatus according to claim 3, wherein each of said reflection points is formed either by grounding or by use of an open termination.

5. A wireless communication apparatus according to claim 4, further comprising a data reception unit constituted by a filter for allowing said incoming radio wave received by said antenna to pass on a predetermined frequency band, and by a data reception unit comprising a wave detection unit for forming a signal;

wherein said data transmission unit and said data reception unit are switched alternately depending on whether or not said outgoing data is transmitted.

6. A wireless communication apparatus according to claim 3, further comprising a data reception unit constituted by a filter for allowing said incoming radio wave received by said antenna to pass on a predetermined frequency band, and by a data reception unit comprising a wave detection unit for forming a signal;

wherein said data transmission unit and said data reception unit are switched alternately depending on whether or not said outgoing data is transmitted.

7. A wireless communication apparatus according to claim 2, further comprising a data reception unit constituted by a filter for allowing said incoming radio wave received by said antenna to pass on a predetermined frequency band, and by a data reception unit comprising a wave detection unit for forming a signal;

wherein said data transmission unit and said data reception unit are switched alternately depending on whether or not said outgoing data is transmitted.

8. A wireless communication apparatus according to claim 1, further comprising a first through a third phase shifter each giving a phase difference of $\lambda/8$ for one-way wave passage therethrough, the phase shifters being connected in series to said antenna;

wherein said n signal channels comprise: a first signal channel for acquiring a first reflected wave by getting said incoming radio wave directly reflected without wave passage through any of said phase shifters; a second signal channel for acquiring a second reflected wave having a phase shifted by $\pi/2$ relative to the phase of said first reflected wave through two-way wave passage through said first phase shifter alone; a third signal channel for acquiring a third reflected wave having a phase shifted by $\pi$ relative to the phase of said first reflected wave through two-way wave passage through said first and said second phase shifters; and a fourth signal channel for acquiring a fourth reflected wave having a phase shifted by $3\pi/2$ relative to the phase of said first reflected wave through two-way wave passage through said first through said third phase shifters; and wherein said reflected wave forming means performs QPSK modulation by dividing said outgoing data into increments of 2 bits each and by assigning phases to the reflected waves through selection of a signal channel in keeping with combinations of 0 and 1 in the 2 bits.

9. A wireless communication apparatus according to claim 8, wherein said reflected wave forming means performs PSK modulation using solely said first and said third signal channels.

10. A wireless communication apparatus according to claim 9, further comprising a data reception unit constituted by a filter for allowing said incoming radio wave received by said antenna to pass on a predetermined frequency band, and by a data reception unit comprising a wave detection unit for forming a signal;

wherein said data transmission unit and said data reception unit are switched alternately depending on whether or not said outgoing data is transmitted.

11. A wireless communication apparatus according to claim 8, further comprising a data reception unit constituted by a filter for allowing said incoming radio wave received by said antenna to pass on a predetermined frequency band, and by a data reception unit comprising a wave detection unit for forming a signal;

wherein said data transmission unit and said data reception unit are switched alternately depending on whether or not said outgoing data is transmitted.

12. A wireless communication apparatus according to claim 1, further comprising a data reception unit constituted by a filter for allowing said incoming radio wave received by said antenna to pass on a predetermined frequency band, and by a data reception unit comprising a wave detection unit for forming a signal;

wherein said data transmission unit and said data reception unit are switched alternately depending on whether or not said outgoing data is transmitted.

13. A wireless communication apparatus for performing data communication under a back scattering system using reflection of incoming radio waves, said wireless communication apparatus comprising a data transmission unit comprising:

an antenna for receiving an incoming radio wave from a data transfer destination;

a first reflected signal channel made of a first radio frequency switch;

a second reflected signal channel made of phase modulating means giving a phase difference of $\lambda/8$ and a second radio frequency switch;

serial/parallel converting means for converting outgoing data from serial form into a parallel signal; and synthesizing/distributing means for distributing said incoming radio wave coming from said antenna to the reflected signal channels and for synthesizing outputs from said reflected signal channels;

wherein activation and deactivation of each of said radio frequency switches are controlled using two data items constituting the data having undergone the serial/parallel conversion, so that said data transmission unit forms said outgoing data using a phase difference pattern of the reflected waves with regard to said incoming radio wave.

14. A wireless communication apparatus according to claim 13, further comprising a data reception unit constituted by a filter for allowing said incoming radio wave received by said antenna to pass on a predetermined frequency band, and by a data reception unit comprising a wave detection unit for forming a signal;

wherein said data transmission unit and said data reception unit are switched alternately depending on whether or not said outgoing data is transmitted.

* * * * *